United States Patent

Magnuski

[15] 3,646,441

[45] Feb. 29, 1972

[54] DIGITAL RADIO COMMUNICATION SYSTEMS USING REPEATERS OPERATING AT SAME FREQUENCY

[72] Inventor: Henry Magnuski, 605 Spring Road, Glenview, Ill. 60025

[22] Filed: Dec. 5, 1969

[21] Appl. No.: 882,414

[52] U.S. Cl. ....................325/13, 325/4

[51] Int. Cl. ....................H04b 7/18

[58] Field of Search ....................325/4, 13, 14, 38.1, 54, 5, 325/141, 312, 321

[56] References Cited

UNITED STATES PATENTS

| | | | |
|---|---|---|---|
| 1,668,674 | 5/1928 | Espenschieo et al. | 325/5 |
| 2,478,409 | 8/1949 | Loughlin | 325/13 |
| 2,509,218 | 5/1950 | Deloraine | 325/5 |
| 2,533,269 | 12/1950 | Lehmann | 325/5 |
| 3,153,701 | 10/1964 | Oshima et al. | 325/13 |
| 3,487,310 | 12/1969 | Bateman et al. | 325/5 |

*Primary Examiner*—Richard Murray
*Attorney*—Alberts, Brezina & Lund

[57] ABSTRACT

Communication systems using a repeater or a chain of repeaters each of which receives information during one portion of a cycle of operation and transmits at the same frequency during a subsequent portion of the cycle in a manner to avoid interference. Digital circuitry is provided for transmitting, repeating and receiving digital signals in a manner such that no information is lost and good spectrum utilization and high fidelity are achieved without compounding distortion and noise effects, permitting use of a large number of relatively low-power repeaters. Delta modulator and demodulator means are provided for converting voice or other analog signals to digital signals and for reconverting the digital signals to analog signals. Radio waves of one frequency can be used and a mobile unit can be moved from the field of a base unit to that of a repeater or from the field of one repeater to that of another, without interruption in communication.

23 Claims, 15 Drawing Figures

Inventor
Henry Magnuski
By: Alberto, Brezina + Lund
Atty.

Inventor:
Henry Magnuski
By: Alberts, Brezina & Lund
Atty's.

Inventor:
Henry Magnuski
By: Alberts, Brezina & Lund
Att'ys.

Inventor:
Henry Magnuski
By: Alberts, Brezina + Lund
Atty.

Inventor:
Henry Magnuski
By: Alberts, Brezina & Lund
Atty.

Inventor:
Henry Magnuski
By Alberts, Brezina + Lund
Att'y

DIGITAL RADIO COMMUNICATION SYSTEMS USING REPEATERS OPERATING AT SAME FREQUENCY

This invention relates to radio communication systems and more particularly to systems using one or more repeaters in a manner such as to achieve highly efficient transmission of information, good spectrum utilization and a high degree of reliability while operating at relatively low power levels.

In prior mobile communication systems, analog frequency modulation is generally used and the mobile unit is reached from the base station directly by using large transmitter power to cover the desired range. In some cases, frequency translation repeaters have been used to extend the range. In such cases, the mobile unit has to be retuned from the base station frequency to a different repeater frequency as it moved away from the base and enters the repeater operation area. This is quite inconvenient and requires an additional frequency channel or channels.

Repeaters using the same frequency for reception and transmission have been proposed using switching at a high audio or superaudio frequency from reception to transmission periods. As proposed, such systems would result in considerable spectrum spreading, would require more power for a given range and would suffer interference from backscatter of transmitter power into the receiver, decreasing the receiver sensitivity and/or causing repeater ringing. But perhaps the biggest disadvantage of such a repeater would be that there are areas where the signals from the base station and the repeater are of about equal strength. As the vehicle passes through such an area, the interference between the two signals on the same frequency would make the reception of information impossible. Thus a smooth transition from the direct reception of the base signal to the reception through the repeater would not be possible.

It is, therefore, an object of this invention to provide an improved communication system in which the range of operation can be greatly extended by using repeaters or repeater chains.

A further object of this invention is to provide a system in which uninterrupted communication is maintained even when a mobile unit is moved from the area covered by one repeater to the area covered by another repeater or base station.

Another object of this invention is to provide communication over great distances using small, low power mobile transmitters and long chains of repeaters.

Still another object of this invention is to provide a good electrospace (spectrum) utilization by permitting several communications to take place in the same area and over the same frequency but using separate repeater chains.

Another object of this invention is to provide voice communication of uniformly good quality regardless of the distance covered.

Still another object of this invention is to provide a mobile communication system to which such features as voice encryption and vehicle location can be easily added.

A feature of the invention is the provision of a radio communication system wherein the repeaters or repeaters' chains, all working on the same frequency, are used to extend the range of operation and are so arranged that no interference areas exist.

A further feature of the invention is the provision of a radio communication system wherein digital modulation is used and repeaters operate to receive, store and transmit digits either in large or small groups or even one by one. The length of the groups and the transmission periods, the transmitter power and the antenna directivity are so selected that there is no interference when a mobile unit is located in the field of two adjacent repeaters.

Another feature of the invention is the provision of a mobile radio communication system wherein the mobile transmitter can be of very small size and power and still will be able to communicate over long distances, if the number of repeaters in the chain is adequately increased and the spacing between repeaters decreased.

Another feature of the invention is the provision of a mobile radio system wherein several repeaters or repeater chains are connected to a base station, thus permitting several mobile units to communicate with the base station at the same time and over the same frequency channel.

Another feature of the invention is the provision of means for regenerating pulses in repeaters of a chain in a manner such that many repeaters can be used in the chain without affecting the quality of the transmitted information.

This invention contemplates other objects, features and advantages which will become more fully apparent from the following detailed description taken in conjunction with the accompanying drawings which illustrate preferred embodiments and in which.

In a preferred mode of practicing the invention, a mobile radio communication system is provided which transmits voice or other information in digital form and which uses repeaters or repeater chains, all transmitting on the same frequency to reach the receiver. The input signal to the transmitter is digital, in the form of continuous pulse train, or if it is voice, it is converted to digital form by Delta modulation or PCM (Pulse Code Modulation). Delta modulation is preferred because it is simpler, does not require sync pulses, provides telephone quality voice reproduction with less bandwidth and is less sensitive to pulse errors due to interference.

The continuous pulse train is stored in one of two shift registers in a transmitter and is transmitted from the other at a fast rate, at least twice as fast as the rate at which it is stored. After the first register is full, the registers are switched around and the information is stored in the second one. Thus the transmitter transmits pulses in groups less than half the time. At a repeater, a received pulse group is stored in a shift register and retransmitted at the same rate as it is received. A phase locked clock can be provided at each repeater to retransmit the pulses at exactly the same rate as they are received. In a receiver, two shift registers are used, one for receiving and storing pulse groups and the other for feeding pulses to a Delta demodulator at a slow rate. They are switched around in the same way as in the transmitter.

In a simple system with short spacing of the repeaters (shown in FIG. 8), the pulses can be transmitted not in groups but one by one. For each pulse coming out of Delta modulator a short pulse, half as long as the Delta modulator pulse or shorter, is transmitted. No shift registers are used in this case.

Figure 1:
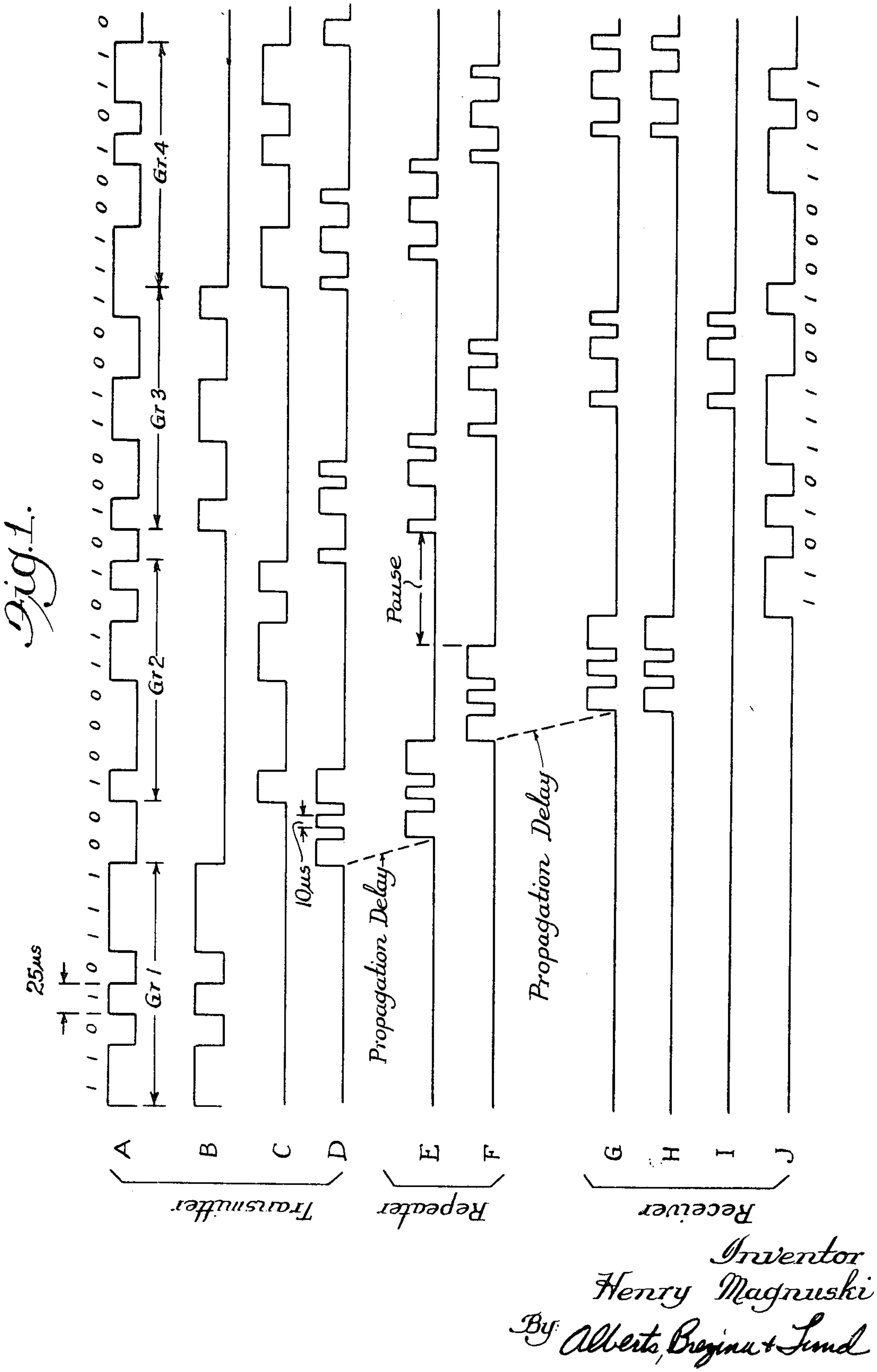
FIG. 1 is a timing diagram illustrating the mode of operation of a system according to the invention.

The timing diagram of FIG. 1 is an example of the operation of apparatus hereinafter described and is described first because it illustrates the theory of operation of a preferred form of communications system according to the invention. Wave form A is that of a digital control signal which might be derived from a digital computer or the like, or from a modulator such as a "Delta" as hereinafter described which converts voice or other analog signals to digital signals. The control signal consists of bits of information produced at an assumed rate of 40 kHz., each bit having a duration of 25 microseconds and having a value of either "1" or "0" as indicated.

Waveforms B and C show the storage of the signals in first and second shift registers of a transmitter. The first group of eight bits, which starts with a "1" bit is stored in the first shift register. The ninth and 10th bits are "0" bits and are not stored, but starting with the next "1" bit (the 11th) the next eight bits are stored in the second shift register.

The 19th bit, being a "0" bit is not stored but starting with the next "1" bit (the 20th), the next eight bits are stored in the first shift register. Then the next group of eight bits (the 28th through the 35th) are stored in the second shift register. Thus, in the example, the first and third groups are stored in the first shift register while the second and fourth groups are stored in the second shift register.

The storage in the shift register is accomplished using a "-slow" clock signal corresponding to the assumed bit rate of 40 kHz. After storage of the first group in the first shift register, a "fast" clock signal having an assumed frequency of 100 kHz. is applied to the first register to develop a group of signals which is applied to an output channel. After storage of the second group, the "fast" clock signal is applied to the second shift register to cause transfer of stored signals from the second shift register to the output channel. Similarly, the "-fast" clock signal is applied to the first shift register after storage of the third group therein and to the second shift register after storage of the fourth group therein. It will be understood that this mode of operation can be continued indefinitely as long as information is to be transmitted.

Waveform D illustrates the form of signal applied to the output channel from the shift registers which may be transmitted to a repeater, preferably by means of radio waves, and waveform E shows the form of signal received at the repeater which is the same as the transmitted signal, but with a certain propagation delay. The repeater stores each group of signals and then retransmits the group, the signal transmitted by the repeater being indicated by waveform F. There is preferably a pause between the end of each transmitted group and the beginning of the next received group, which can be accomplished with a "fast" clock in the transmitter having a rate more than twice the rate of the "slow" clock.

The signal transmitted by the repeater is received at a receiver after a certain propagation delay, the form of the received signal being indicated by waveform G. At the receiver, the groups are stored alternately in two shift registers, while clock signals are applied thereto at the "fast" rate. Thus the first and third groups in the example are stored in the first shift register of the receiver while the second and fourth groups are stored in the second shift register of the receiver. Waveform H indicates the signals stored in the first shift register of the receiver while waveform I indicates the waveform of the signals stored in the second shift register of the receiver.

After storage of the first group in the first shift register of the receiver, "slow" clock pulses are applied to the shift register and the information is transferred to an output line. Then after storage of the second group in the second shift register, "slow" clock pulses are applied thereto to transfer the information to the output line. Similarly, the "slow" clock pulses are again applied to the first shift register after entry of the third group therein and again to the second shift register after entry of the fourth group therein. The result is a signal as indicated by waveform J which is the same as the original input indicated by waveform A. If the original waveform was produced by a Delta modulator, the output waveform may be applied to a Delta demodulator to produce a voice or other analog signal.

Figure 2:
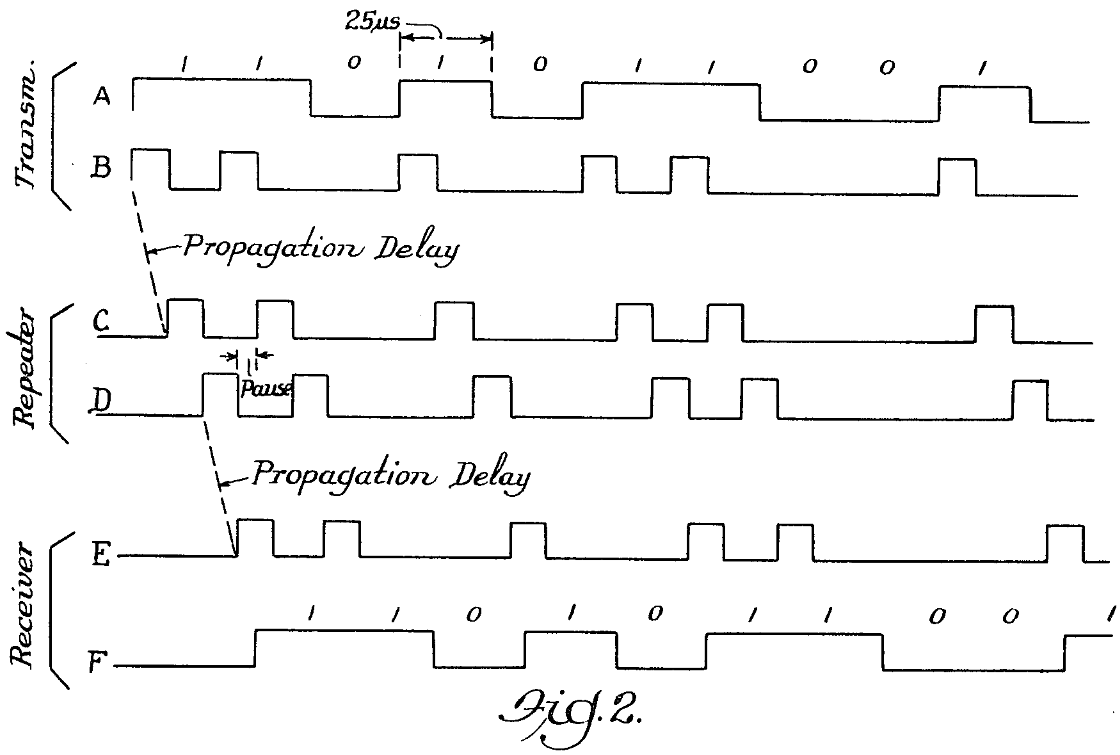
FIG. 2 is a timing diagram similar to FIG. 1 illustrating a modified mode of operation.

FIG. 2 is a timing diagram similar to FIG. 1, but showing a modified mode of operation which may be described as a pulse by pulse mode. In this arrangement, each bit of an input waveform A is immediately transmitted as a pulse of short duration, assumed to be 10 microseconds as compared to a 25 microsecond bit duration, the transmitted signal being indicated by waveform B.

The repeater receives the transmitted signal with a propagation delay, assumed to be 10 microseconds, the signal received by the repeater being indicated by waveform C. The received signal is immediately retransmitted by the repeater as indicated by waveform D, a pause being developed between the end of each transmitted pulse and the next received pulse.

The signal transmitted by the repeater, indicated by waveform D, is received at the receiver with another propagation delay, the input signal at the receiver being indicated by waveform E. At the receiver, a sampling is performed at about the center of each pulse interval and if a pulse is received, a 25 microsecond pulse is generated, the signal produced at the receiver being indicated by waveform F and being a duplicate of the original waveform A.

In both of the illustrated modes of operation, reception and transmission occur at different times, to avoid interference and to allow operation at the same frequency. The pause between the end of each transmission at the repeater and the next received signal is important in minimizing interference which might be produced by backscatter of transmitter power into the receiver. The transmission of digital signals is highly advantageous because of the fact that noise and amplitude distortion effects will not affect the signals transmitted by the repeaters, unless extremely severe. Even if a pulse is occasionally lost due to noise, it will not affect the operation of the final Delta demodulator to a significant extent. As a result, a large number of repeaters can be used and they can be located relatively close together so that the required transmitted power at each repeater can be quite low.

Another important advantage is that a mobile receiver unit can be moved from the field of a base unit to that of a repeater or from the field of a repeater to that of another repeater, without interruption and interference.

Figure 3:
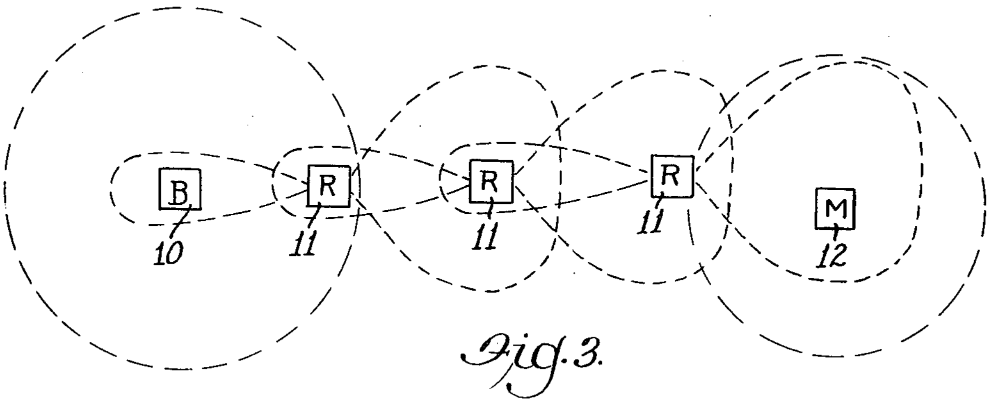
FIG. 3 shows diagrammatically a base station, a chain of repeaters and a mobile station and the transmission and reception fields thereof, arranged in accordance with the invention.

FIG. 3 shows an example of the system in accordance with the invention in which a base station 10 communicates with a mobile unit 12 through repeaters 11. Three such repeaters are shown. Each repeater is equipped with two anntennas whose patterns are shown on FIG. 3. One antenna transmitting to or receiving from the mobile unit has a relatively broad pattern to cover the desired area in which the vehicle may operate. The other antenna receives or transmits the pulses toward the adjacent repeater or base station and should be as directive as practically possible to avoid interference and provide strong signals. Yagi-type antennas or antennas with reflectors can be used for this purpose. The vehicle and the base may be equipped with omnidirectional antennas.

Figure 4:
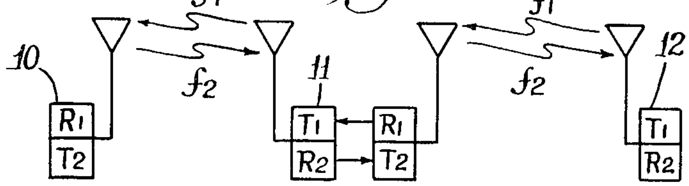
FIG. 4 shows diagrammatically an example of an arrangement of transmitting and receiving portions of the stations and repeaters of the system of FIG. 3.

Usually two different frequencies are used in the mobile unit, one for transmitting and the other for receiving. FIG. 4 shows such an arrangement. In this case each repeater 11 (only one is shown in FIG. 4) has two receiver-transmitter paths going in opposite directions.

Figure 5:
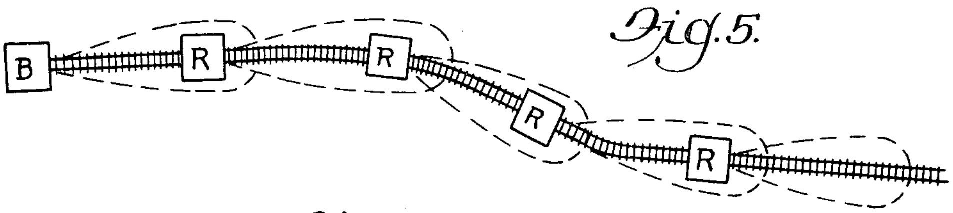
FIG. 5 shows a mobile communication system suitable for railroads, buses, etc., using repeaters in accordance with the invention.

FIG. 5 shows a mobile communication system suitable for railroads, bus lines, river barges and other similar services in which the vehicles move along a defined path. Only the antenna patterns transmitting to the vehicles are shown in FIG. 5. These patterns can be quite directive and the positions and power of individual repeaters can be selected to follow and to cover the right of way and not much more. Such a system permits uninterrupted telephone conversations from moving trains, buses etc. Obviously, the repeater chains can be sectionalized and the sections connected by other means of communication to the terminals.

FIG. 5 also illustrates how a communication path can be "-wired" without using a physical wire. For example, a military patrol can leave small, inconspicuous repeaters in a jungle path behind it and will thus be able to communicate with a distant base station using small, portable radios.

Figure 6:
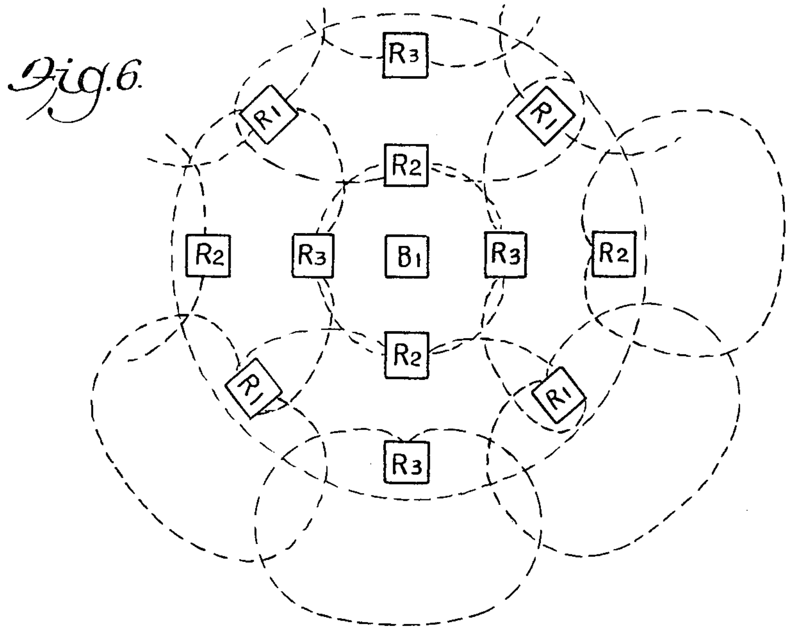
FIG. 6 shows an area mobile communication system with repeaters, according to the invention.

FIG. 6 shows an example of a system which covers an area such as a city or operation area in case of military systems. The base station B is in the center and transmits to the first ring of repeaters. All repeater transmitters shown on FIG. 6 are equipped with a dipole antenna with a rod reflector one-quarter wavelength behind the dipole which results in a cardioid antenna pattern as shown. In order to avoid interference the repeaters are in three groups $R_1$'s, $R_2$'s and $R_3$'s and the transmission periods are so arranged by coding (as will be described later) or by delays built into the repeaters that when group 1 is transmitting, groups 2 and 3 are receiving. Then group 2 is transmitting the stored digital information and finally group 3 is transmitting.

Alternatively the base station can be equipped with four directive antennas transmitting different information in four different directions.

Finally all the repeaters could be connected by separate cables or microwave links to the base. In this case the base could communicate with almost as many vehicles as there are repeaters (some vehicles could sometimes engage two or even three repeaters at the same time) and in addition cover the vehicles in immediate vicinity by an omnidirectional antenna. Such an arrangement will permit an excellent electrospace (spectrum) utilization.

Figure 7:
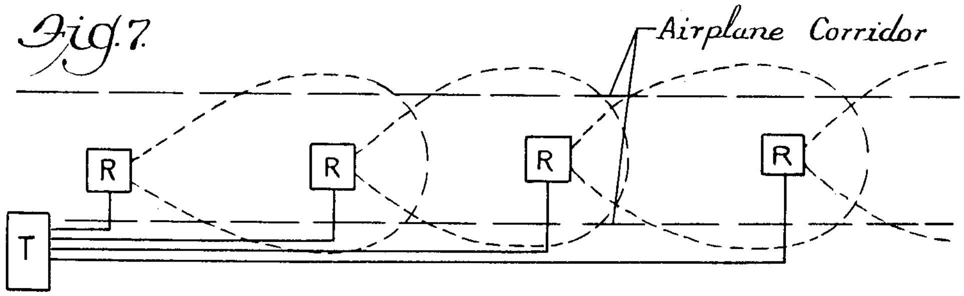
FIG. 7 shows a mobile communication system suitable for airplanes, according to the invention.

FIG. 7 shows a system suitable to provide communication or telephone service for the planes flying transcontinental routes. In this case the repeaters are spaced 150–200 miles apart because the line of sight of the airplane flying at the altitude of 20,000 feet for example, is 200 miles. Each repeater is separately connected to a terminal T by other means, such as cables or line-of-sight microwaves. The spacing between repeaters is too great in this case for direct radio connection. The transmitter power of an order to 1 watt in the airplane and in each repeater will secure a good telephone connection from coast to coast in a system of FIG. 7. In addition several simultaneous telephone connections are possible if the airplanes flying a given route are spaced by two or more repeater spacings (400 miles or more).

Figure 8:
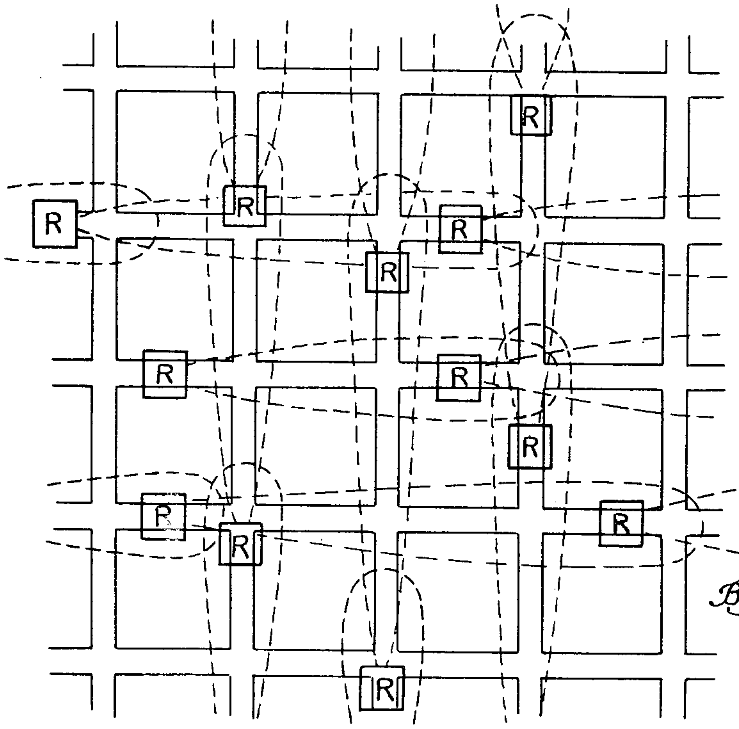
FIG. 8 shows a mobile communication system suitable to provide mobile telephone service in the city, according to the invention.

FIG. 8 shows a system capable to provide a mobile telephone service in a city. The repeater chains are stretched alongside city streets. A separate chain is used for each north–south street and each east–west street. The transmitters have very low power in milliwatt range and highly directive antennas. They are placed every few blocks apart on the top of street light posts or on other convenient supports. High frequencies in the 400 to 1,000 MHz. range can be used to advantage in such a system because highly directional antennas of small sizes are possible at these frequencies. The mobile transmitters have also a very small power only sufficient to reach the nearest repeater. If such a system is used for police instead of mobile telephone, the low power requirement will permit each police patrolman to carry inconspicuous small pocket or wrist radio for instant contact with headquarters. The repeater chains can be sectionalized if the streets are long. Each chain is connected to telephone exchange (or to police headquarters or other centrals) by separate cables, wires or similar means. As the vehicle engages a certain repeater chain, the light flashes in a central and a connection is established in more or less usual way. A vehicle location can also be provided by having a city map with the repeater chains engaged in conversation shown as lighted lines. Each time the vehicle crosses the street intersection, it will engage momentarily a second chain of repeaters which is being crossed. This will pinpoint the vehicle as being at a cross point of two engaged chains. In this system several simultaneous conversations are possible by vehicles located in different parts of the city, using different repeater chains. Vehicle locaters will help anticipate the required switching as the vehicle moves from one chain to the other. Also interference could be anticipated if two vehicles move toward each other. Then one of them could be switched to a chain working on a different frequency if several channels are provided.

Similar systems but with microwatt power can be used inside buildings such as hospitals for paging and communication with the doctors or other personnel.

Figure 9:
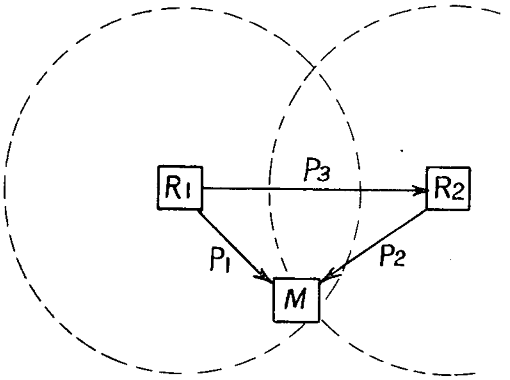
FIGS. 9 and 10 are diagrams for explaining how interference is avoided with respect to two adjacent repeaters.
Figure 10:
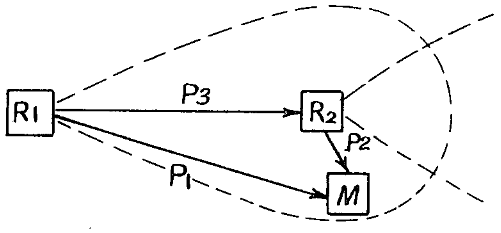

FIG. 9 and FIG. 10 are helpful in explaining how the invention prevents or reduces interference by using repeaters with antennas which do not radiate backwards. If omnidirectional antennas would be used as shown on FIG. 9, then the vehicle M passing the area centrally located between the two repeaters would receive about equal signals from repeaters $R_1$ through path $P_1$ and from repeater $R_2$ through path $P_2$. In this case long pauses would be required between transmission and reception periods at each repeater to avoid reception of both signals simultaneously resulting in interference. Transmission from $R_1$ reaches vehicle M much sooner over short path $P_1$ than it reaches $R_2$ over long path $P_3$. Then $R_2$ retransmits the information which is reaching M with delay over path $P_2$. If a pause between retransmission and reception periods at least equal to propagation time over path $P_3$ were not provided, $R_1$ would start transmitting before M stops receiving from $R_2$ and interference would result. If directive antennas, not radiating backwards as shown on FIG. 10 are used, then, the areas of about equal signal strengths are in the vicinity of repeater $R_2$. The vehicle M may receive a weak signal from distant $R_1$ and about equally weak signal from side lobes of $R_2$ antenna. In this case $P_3$ is about equal to $P_1$ and the signals from $R_1$ are received by $R_2$ and M at about the same time. A short pause at the repeater after retransmission equivalent to short path $P_2$ propagation time is sufficient to avoid interference. Thus one characteristic of the system according to this invention is the use of directive antennas at the repeaters.

Another characteristic of the systems according to this invention is the very small transmitter power required to be used. Referring to FIG. 3, if for example 10 watts of power is required to reach vehicle 12 directly from the base station 10, at least 24 db. less power is required to reach repeater 11 from base 10 because the distance about is four times shorter and the signal attenuation increases 12 db. per octave of distance in ground wave propagation. Thus instead of 10 watts, 40 milliwatts will be sufficient. The use of directive antennas having gains at the repeaters will further substantially reduce the power requirement, although the slightly larger bandwidth required by digital transmission may partially offset this reduction. The use of larger power than that required for the reception of pulses almost without errors, will not improve the system; to the contrary, it may cause repeater to overshoot and interference may result.

A few examples of the equipment which can be used to implement the systems in accordance with this invention will be described next.

Figure 11:
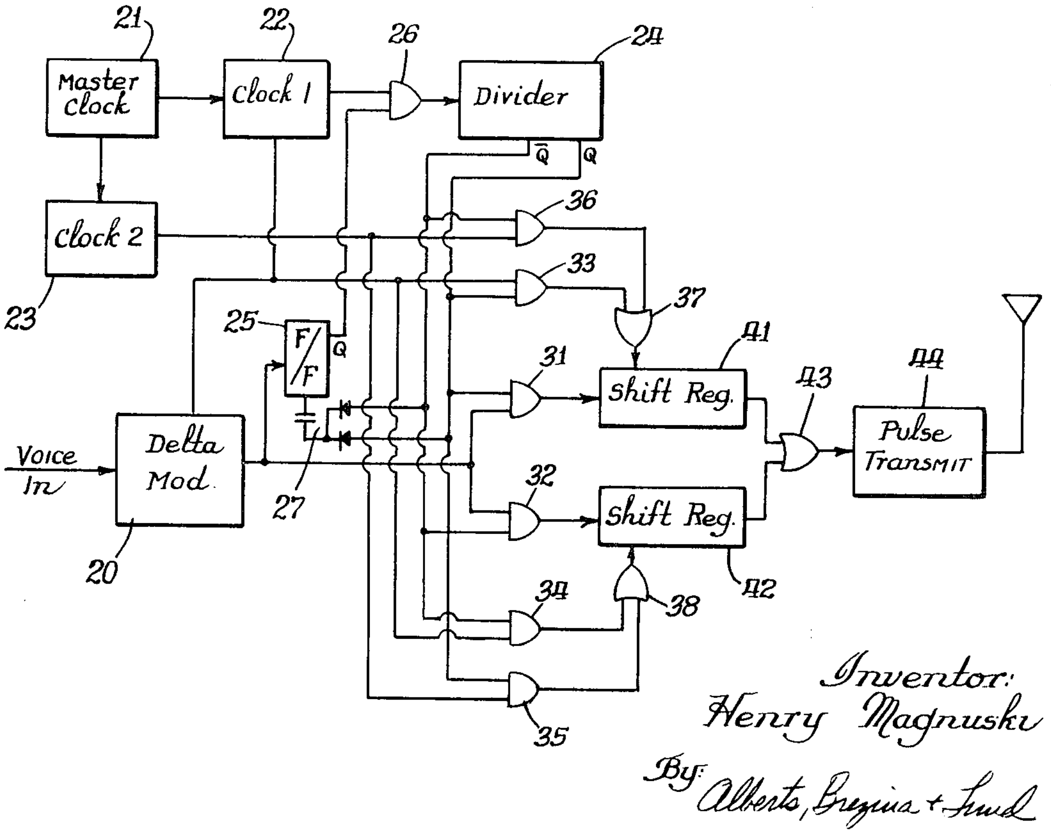
FIG. 11 is a block diagram of a transmitter in accordance with the invention.

The basic purpose of the transmitter equipment is to continuously store the digital information at a slow rate and to transmit it in groups at twice as fast a rate or faster. FIG. 11 shows one possible transmitter logic which can be used when practicing the invention. The voice input is applied to Delta modulator 20. There is a variety of Delta modulators which can be used including the one described in my U.S. Pat. No. 3,453,562. Alternatively PCM also could be used as previously mentioned. Clock 22 which is feeding the Delta modulator 20, may provide pulses at a rate of 38.4 kHz. which is a good compromise as far as voice quality is concerned and a binary multiple of standard data rates such as 2,400 bits / sec. The output pulse train from Delta modulator is applied either to shift register 41 via gate 31 or to the shift register 42 via gate 32. One of these two AND-gates 31 or 32 is opened by the output Q from frequency divider 24 while the other is closed by $\overline{Q}$ output or vice versa. At the same time as the gate 31 is opened to apply the Delta pulse train to shift register 41, gate 33 is also opened to apply the Clock 22 pulses to register 41, via the OR-gate 37 thus permitting the storage of pulses at the clock 22 rate.

The frequency divider 24 is selected in accordance with the length of shift registers 41 and 42. If, for example, the registers are 128 bits long, then the divider 24 has eight stages and counts 128 clock pulses before its final stage flips. The first pulse from Delta modulator flips the flip-flop 25 which opens the gate 26 and applies clock 22 to the divider (counter) 24. After counting 128 clock pulses, the divider will flip disconnecting one shift register from Delta modulator which is now full and connecting the other. Divider 24 has two more functions. It controls two more AND-gates 35 and 36 which apply the fast clock 23 to registers 41 or 42 in order to discharge the stored pulses to the pulse transmitter 44 via OR-gate 43. The other function is to reset the flip-flop 25 each time its final stage flips. This can be done by using a circuit 27 consisting of two diodes and one capacitor. In this way the flip-flop 25 is set to start the new count when the next pulse from Delta Modulator is received.

Clock 23 is at least twice as fast as clock 22 or faster, 2.5 times for example. Both these clocks are derived from crystal controlled Master clock 21 and are in fixed relation to each other. In order to provide pauses between transmission and reception at the repeaters, the information has to be transmitted at more than twice the rate it is accumulated. However, the faster the operation of the clock 23, the wider is the bandwidth occupied by the system.

In more sophisticated systems, application of signals from clock 23 to shift registers may be delayed in order to transmit some other information ahead of the information pulses' group. For example, the address of the desired party could be transmitted in digital form. Among other possibilities are the transmission of the sync pulses, the sender's address and/or of a code which is recognized by a certain repeater chain unlocking it and permitting it to retransmit the information. All other chains are locked out. Also, in order to obtain privacy or secrecy a pulse scrambler may be inserted right after a Delta modulator.

The implementation of the transmitter is quite simple when using IC's (Integrated Circuits). For example, two shift registers 41 and 42 are available as a single IC package from several suppliers. Frequency divider 24 is also a single IC (RCA type CD4004 for example). Likewise three or four gates are packaged in a single IC. Thus the whole transmitter can be very small, occupying a few cubic inches.

Figure 12:
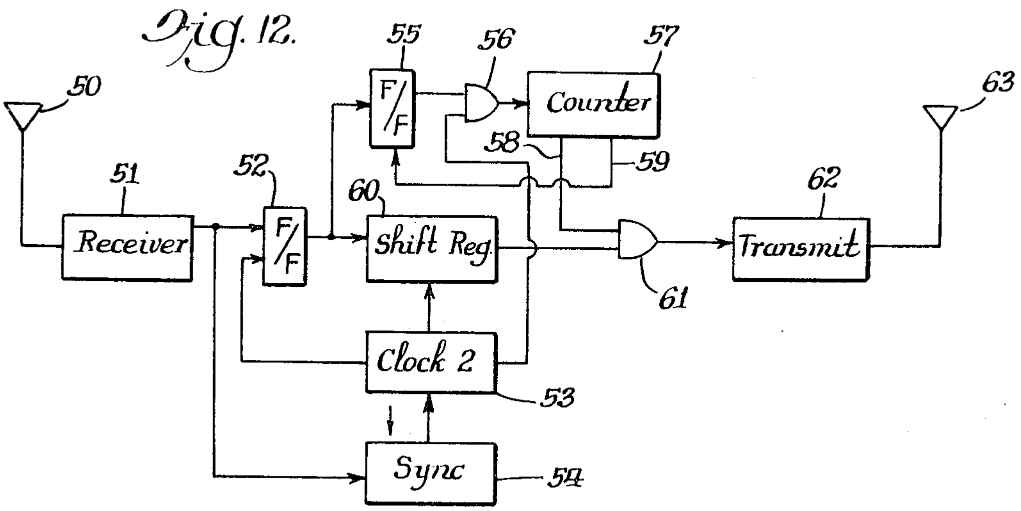
FIG. 12 is a block diagram of a repeater according to the invention.

The block diagram of a repeater is shown on FIG. 12. Directive antenna 50 is connected to receiver 51. Detected pulses from receiver 51 are applied to the J–K flip-flop 52 to which the pulses from the clock 53 are applied. If the clock is phased correctly, the detected pulse will be sampled in the center and the flip-flop 52 flipped one way or the other by the clock 53 depending whether the pulse was detected or not. The output of 52 is applied to the shift register 60 which may be the same as registers 41 and 42 used in the transmitter. Clock 53 which is also applied to this register 60 operates at the same rate as clock 23 in the transmitter. The received pulses are also applied to synchronizing circuit 54 which helps to keep clock 53 on frequency and in phase required for optimum operation. All clocks in the system are usually crystal controlled and sufficiently stable to receive the short group of pulses correctly. However, a phase correction in order to sample pulses in the center is desirable. Output of 52 is also applied to the bistable flip-flop 55. The first received pulse changes the state of this flip-flop, thus opening the AND-gate 56 which applies the clock 53 to the frequency counter (divider) 57. This counter is similar to divider 24 used in the transmitter. For example, if 128 stage shift registers are used, counter 24 will count 128 pulses before the last stage is flipped, but counter 57 will count 256 clock pulses before its final stage flips.

The operation of the repeater is as follows: A group of received pulses, 128 bits long in our example, is stored in the shift register 60. With the first pulse received counter 57 is energized and after counting 128 clock pulses, the output from the eighth stage shown as connection 58 opens the gate 61 which permits to retransmit the stored pulses through transmitter 62 and antenna 63. When the count reaches 256 and all the stored pulses are retransmitted, the eighth stage will flip again closing the gate 61. At the same time the output Q from the eighth stage will reset the flip-flop 55 through the connection 59. Thus the repeater is ready to receive and retransmit the next group of pulses.

Figure 13:
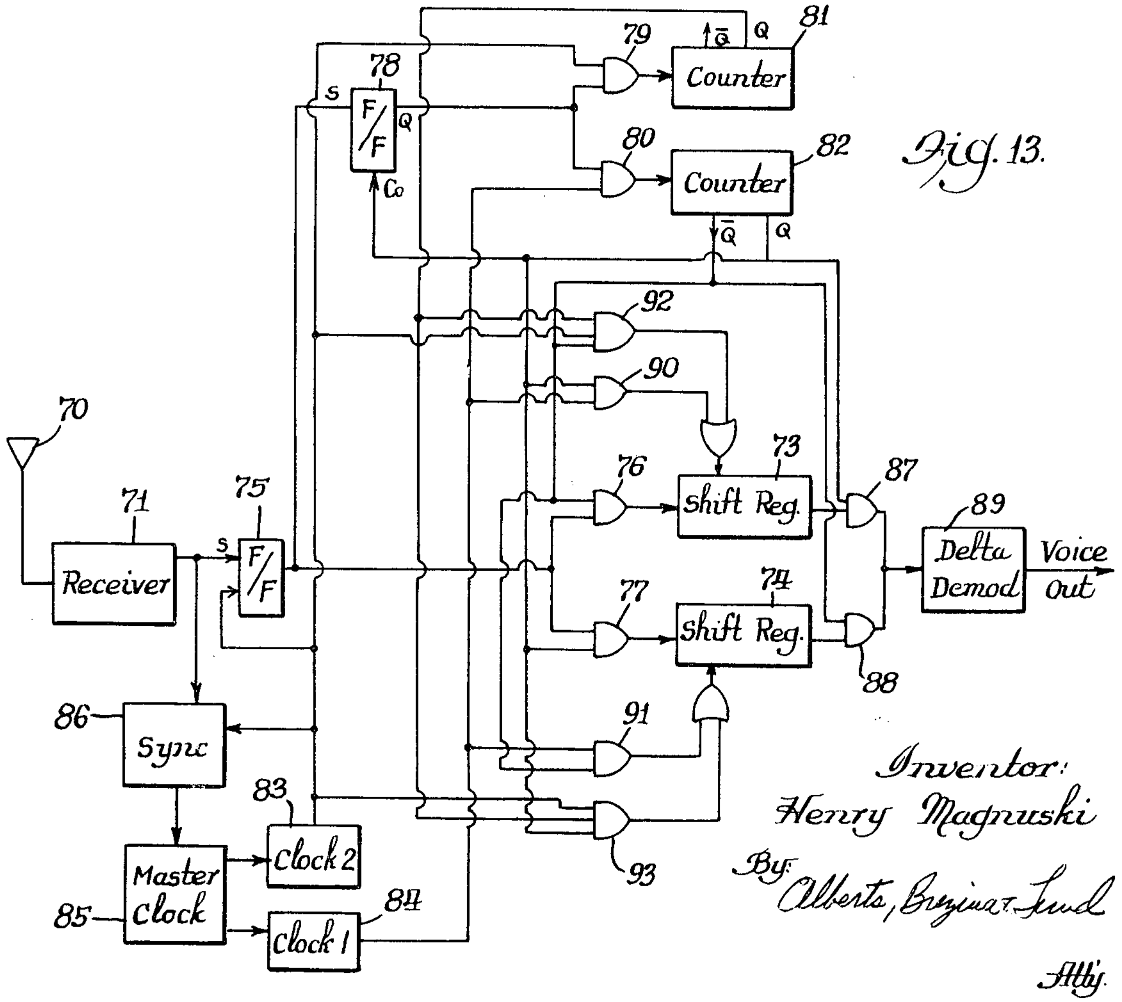
FIG. 13 is a block diagram of a receiver according to the invention.

FIG. 13 shows the block diagram of the receiver-demodulator. Its basic function is opposite to that of the transmitter, to store the received pulse group in one of the shift registers at a fast clock rate, while delivering the stored group to the Delta demodulator at a slow clock rate from the other shift register. In this way the reproduced voice signal is the exact duplicate of the transmitted one regardless of how many repeaters were used in the system.

In the circuit of FIG. 13, antenna 70 and receiver 71 receive the pulse groups and apply them to either shift register 73 or 74 via flip-flop 75 and gate 76 or 77. The first received pulse flips the bistable 78 which opens two gates 79 and 80, thus applying clock pulses to two counters 81 and 82. Pulses from the fast clock 83 are applied to counter 81 and from the slow clock 84 to counter 82. Both clocks are derived from the master clock 85 whose phase is locked and controlled by the sync circuit 86 in similar way as in the repeater of FIG. 12. Counter 82 controls the input gates 76 and 77 to the shift registers and also the output gates 87 and 88 from the registers in such a way that when the input gate to one register is open, the output gate of the second one is also open. After the count is completed, the gates and registers are switched around. Counter 82 also controls the application of signals from the slow clock 84 via gates 90 and 91 to the shift register which is connected to the Delta demodulator 89. Counter 82 also resets the flip-flop 78. Counter 81 controls the application of fast clock 83 pulses to the registers via triple AND-gates 92 and 93 which are also controlled by counter 81 in such a way that a fast clock 83 can only be applied to the register which is not connected to the Delta demodulator and only for the period when the pulses are received and stored and the counter 81 is counting. As soon as count is completed, gates 92 and 93 are closed. In this way the pulse group is stored and kept in the register until it is connected to the demodulator to be discharged at a slow rate. The Delta demodulator consists of a flip-flop which charges or discharges the integrating capacitor, a low pass filter and a voice amplifier.

The systems according to the invention can be designed either by providing sufficient pauses between transmission and reception periods in the repeaters so that there is no interference, or by compromising and tolerating some interference. In this last case the fast clock rate is twice the slow clock rate and no pauses are provided. In such a system the mobile vehicle will occasionally find the pulse groups transmitted by two repeaters overlapping and a few digits destroyed by interference. However, experiments show that if long groups are transmitted such as 128 bits or longer, and Delta modulation is used, the errors or destruction of a few pulses at the beginning or the end of a large group is almost unnoticeable in voice transmission. The advantage of such a system is smaller bandwidth, but it has possible disadvantages with regard to data transmission. The encryption equipment, if used, may be upset by errors, and the delay in transmission of information in a system using many repeaters will be long because each repeater delays the retransmission of information by the time occupied by one pulse group and long pulse groups have to be transmitted.

The preferred system is therefore one in which the fast clock rate is more than two times faster than the slow rate to provide sufficient pauses to avoid interference altogether. How long the pauses should be depends on system configuration. If Delta modulation with 38.4 kHz. clock rate is used, each pulse is 26 microseconds long but it is transmitted much faster, for example as a 10-microsecond pulse, which corresponds to about 2 miles propagation time. Therefore, if the difference between paths $P_3$ plus $P_2$ and $P_1$ of FIG. 10 is less than 2 miles only one pulse may be destroyed out of the group and the pause equivalent to 1 pulse or 10 microseconds would be sufficient. The difference between the paths can never be greater than the spacing between repeaters, however, since directive antennas are used, the path difference is much smaller as previously explained in connection with FIG. 10. A good practice is to make the pauses of about one-fifth of the propagation time between repeaters.

In a system depicted on FIG. 7, the spacing is 150–200 miles equivalent to 750–1,000 microseconds. Assuming that 10-microseconds pulses are transmitted, one-fifth of the spacing would correspond to about 20 pulses. In order to conserve spectrum, the pause should be small fraction of group transmission time, so long groups such as 128 pulses or longer should be transmitted in this system. However, in this system repeaters are not directly connected and a proper staggering of transmission times of adjacent repeaters should be arranged by the terminal.

In systems of FIGS. 5 and 6 the distance between repeaters may be from less than a mile to a few miles. In this case pauses equivalent to one or two 10-microsecond pulses will be sufficient and therefore pulse groups should be four, eight or 16 bits long.

Figure 14:
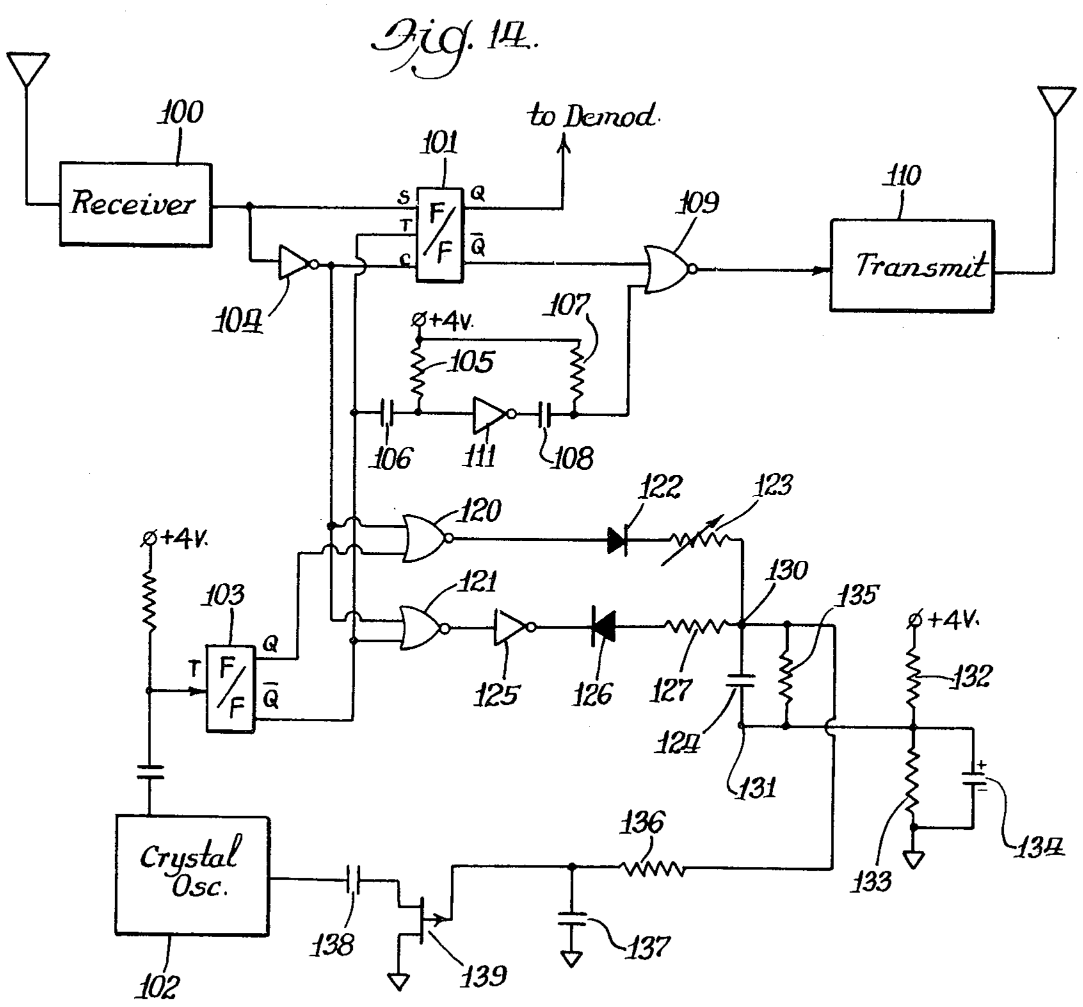
FIG. 14 is a diagram of simplified pulse by pulse repeater according to the invention suitable for system shown in FIG. 8.

Finally, in the system depicted in FIG. 8, the repeaters are a few blocks or fraction of a mile apart, therefore a pause of one or two microseconds will be sufficient to avoid interference. In this case, for each Delta modulation pulse, a 10 microsecond pulse can be transmitted and the equipment greatly simplified. There is no need for two clocks, shift registers for storage, counters, etc. FIG. 14 shows how simple the repeater implementation can be in this system. The 10 microsecond pulses (spaced 26 microseconds apart) are detected by receiver 100 and applied to the J – K flip-flop 101. The clock consists of the crystal oscillator 102 working on 76.8 kHz. which is connected to flip-flop 103, which divides the frequency in half and delivers clock pulses. The clock pulses are applied to flip-flop 101 to which both the signal and the inverted signal by inverter 104 are applied. Thus the flip-flop 101 will stay in one position or will be flipped to it if the pulse is received at the time the clock pulse is applied. If the pulse is not received, this flip-flop will stay or will be flipped to the other position (providing $\overline{Q}$ output).

The clock pulses are also applied to the inverter 111 via capacitor 106 to generate the pulses for retransmission with the proper delay. The values of capacitor 106 and resistor 105 determine the delay and the values of capacitor 108 and resistor 107 determine the length of the retransmitted pulse. Gate 109 is open if the pulse was received ($\overline{Q}$ output zero) and thus the pulse determined by components 105 to 108 is applied to transmitter 110 for retransmission. The circuit of FIG. 14 can also be used in the final receiver. Then flip-flop 101 is feeding the Delta demodulator and components 105 to 111 are omitted.

Figure 15:
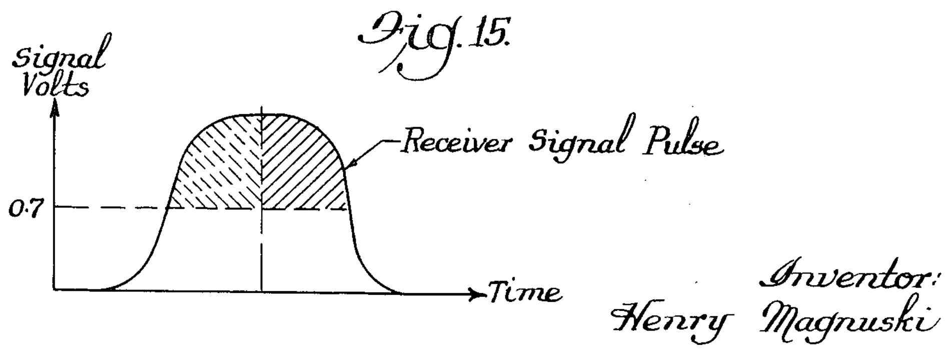
FIG. 15 is a diagram showing the manner of setting gain controls to obtain good noise immunity.

The sync circuit which will be described next is correcting the frequency and the phase of clock pulses in such a way that the incoming signal pulses are sampled approximately in the center or at maximum amplitude (if they are not symmetrical). It consists first of two gates 120 and 121 to which the inverted signal is applied. The clock Q output is applied to gate 120 and the Q to gate 121, thus one of them is open when the other is closed or vice versa. Gate 120 is connected to the terminal 130 of the capacitor 124 via diode 122 and resistor 123 and will charge capacitor 124 if the signal is received and the clock Q output is zero. Gate 121 is connected to terminal 130 of the capacitor 124 via inverter 125, diode 126 and resistor 127 and will discharge capacitor 124 if the signal is received and the clock Q output is zero. Thus as shown on FIG. 15, if the clock flips in the center of the received signal pulse, capacitor 124 will be charged during the first half of the pulse and discharged during the second half of the pulse. The other terminal 131 of capacitor 124 is connected to the supply voltage divider consisting of resistors 132 and 133 and a large blocking capacitor 134. If resistors 132 and 133 are equal, the terminal 131 of capacitor 124 will be at half of the supply voltage and the charge and discharge rates will be equal. Thus if the signal is cut by clock flip exactly in half as shown on FIG. 15, the charge on the capacitor will not change and terminal 130 will remain at half supply voltage. A large leak resistor 135 is connected across the capacitor 124 to establish this voltage when the signal is not received. However, if the clock does not flip in the center of the signal, capacitor 124 will be either charged or discharged and a different, error voltage will appear on terminal 130. This error voltage is filtered and delayed by resistor 136 and capacitor 137 and is used to control the frequency and the phase of crystal oscillator 102. This can be done in many ways by using varactor diodes for example. However, a convenient way to do it is by attaching small condenser 138 to one of the crystal terminals and using FET transistor 139 as a variable resistance. This will pull the crystal frequency and change the phase of clock pulses so that the flips occur close to the center of receiving pulses. The exact position of the flips can be adjusted by making variable the resistor 123 (or 127 or 132 or 133). The received pulses have to exceed 0.7 volts approximately to activate flip-flop 101 and inverter 104. By setting the gain control in the receiver 100 so that the average received pulse is about 1.4 volts as shown on FIG. 15, a 6 db. threshold and good noise immunity is obtained.

FIG. 14 and FIG. 12 show the repeater circuit for transmission in one direction only. For two way systems, this circuit has to be duplicated for the other direction.

There are many advantages of the mobile systems designed according to the invention. The mobile equipment and the repeaters are small and the transmitted power is low. Yet the received voice has uniform quality and constant volume independent of how long the distance is and how many repeaters were engaged in transmission. The vehicle can move from one repeater area to another without interruption of communication. (Sometimes a weak click may be heard due to receiver resynchronization but it does not interfere with voice communication). The system permits to transmit data. Crypto can be easily added. Also dialing and signaling can be incorporated. The invention is applicable to many systems from the very small, such as paging with repeater spaced a few scores of feet apart, to very big, such as cross-continental airplane telephone systems.

I claim as my invention:

1. In a communication system, a transmitter comprising: input and output channels, cyclically operable clock means, and regulating means controlled by said clock means for supplying an output signal to said output channel modulated in accordance with an information signal applied to said input channel with said output signal being developed only during a portion of each cycle of operation of said clock means having a maximum duration equal to one-half of the duration of one complete cycle, said output signal being an on-off digitally modulated signal, said regulating means comprising input means coupled to said input channel to supply a digital control signal derived from said information signal, and control means responsive to said control signal for developing said digitally modulated output signal, said digital control signal having a certain bit rate, and said digitally modulated output signal being developed at a bit rate equal to at least twice said certain bit rate.

2. In a system as defined in claim 1, a plurality of bits of digital information being developed on said output channel during said portion of each cycle of operation of said clock means.

3. In a system as defined in claim 1, one bit of digital information being developed on said output channel during said portion of each cycle of operation of said clock means.

4. In a system as defined in claim 1, said input means comprising a modulator arranged to convert an analog input signal to a digital control signal.

5. In a system as defined in claim 4, said modulator being a Delta modulator.

6. In a system as defined in claim 1, a receiver comprising: an input channel arranged to receive said digitally modulated transmitter output signal, an output channel, and demodulation means arranged to respond to the received digitally modulated signal to apply to said receiver output channel a digitally modulated signal at a bit rate equal to said certain bit rate.

7. In a system as defined in claim 1, said control means comprising a plurality of digital storage means, means operable during each cycle of operation of said clock means to sequentially apply said digital control signal to said plurality of storage means, and means for sequentially controlling transfer of signals from said plurality of storage means to said output channel with signals being applied from one of said storage means to said output channel while said control signal is applied to another of said storage means.

8. In a system as defined in claim 7, said digital control signal having a certain bit rate, each of said storage means comprising a shift register having a number of stages equal to the duration of said portion of each cycle of operation of said clock means divided by the duration of one bit signal interval.

9. In a system as defined in claim 8, said clock means being arranged to supply a first clock signal at a rate equal to said certain bit rate and a second clock signal at a rate at least equal to twice said certain bit rate, means for applying said first clock signal to each shift register during application of said digital control signal thereto, and means for applying said second clock signal to each shift register during transfer of signals therefrom to said output channel.

10. In a system as defined in claim 1, a repeater comprising: an input channel arranged to receive said transmitter output signal, an output channel, and transmission delay means responsive to the received transmitter output signal to develop on said repeater output channel a delayed signal corresponding to each modulated portion of the received signal with a delay at least equal to the duration of said modulated portion.

11. In a system as defined in claim 10, said transmitter and said repeater respectively including radio wave transmitting and receiving for transmitting said transmitter output signal from said transmitter output channel and receiving said signal at said repeater input channel.

12. In a system as defined in claim 11, said repeater comprising radio wave transmission means for transmitting said repeater output channel signal.

13. In a system as defined in claim 12, said transmitter and repeater radio wave transmission means being operative at the same frequency.

14. In a system as defined in claim 11, said radio wave receiving means at said repeater comprising antenna means having a directional pattern such as to increase sensitivity to radio waves transmitted from said transmitter and to decrease sensitivity to radio waves eminating from other directions.

15. In a system as defined in claim 10, a at least one additional repeater comprising: an input channel arranged to receive the first repeater output signal, an output channel, and transmission delay means responsive to the received first repeater output signal to develop on said second repeater output channel a delayed signal corresponding to each modulated portion of said second repeater received signal with a delay at least equal to the duration of said modulated portion.

16. In a system as defined in claim 15, said transmitter and said first repeater respectively including radio wave transmitting and receiving means for transmitting said transmitter output signal from said transmitter output channel and receiving said signal at said repeater input channel, and said first and second repeaters respectively including radio wave transmitting and receiving means for transmitting said first repeater output signal from said first repeater output channel and receiving said signal at said second repeater input channel.

17. In a system as defined in claim 16, said transmitting and receiving means being all operative at the same frequency.

18. In a system as defined in claim 16, said radio wave receiving means at said second repeater comprising antenna means having a directional pattern such as to increase sensitivity to radio waves transmitted from said first repeater and to decrease sensitivity to radio waves eminating from other directions.

19. In a system as defined in claim 16, said radio wave transmitting means at said first repeater comprising antenna means having a directional pattern such as to increase the field strength of radio waves transmitted to said second repeater while decreasing the field strength of radio waves transmitted in other directions.

20. In a communication system, a repeater for receiving transmitted signals modulated by bits of digital information on a clock cycle of a certain frequency with modulation occurring only during an initial portion of each cycle having a maximum duration equal to one-half of the duration of the complete cycle and with each bit of digital information occurring at a predetermined time in relation to the start of the cycle, said repeater comprising: input and output channels, said input channel being arranged to receive said transmitted signals, clock means controlled in response to received signals from said input channel to develop a clock signal of said certain frequency, storage and delay means responsive to received signals from said input channel and controlled from said clock signal for responding to each bit of received digital information and applying a bit of corresponding informational content to said output channel with a fixed delay at least equal to the duration of said initial portion of the cycle.

21. In a system as defined in claim 20, for receiving transmitted signals wherein there are a plurality of bits of digital information during said initial portion of each cycle, said storage and delay means comprising a shift register having an input to which said received signals are applied from said input channel and having an output, gate means for applying signals from said output to said output channel, and counter means responsive to said clock signal for closing said gate means during the initial portion of a cycle and opening said gate means during a later portion of a cycle.

22. In a system as defined in claim 20, for receiving transmitted signals wherein there is one bit of digital information in each cycle, said storage and delay means comprising a flip-flop circuit having a set input coupled to said input channel and an output coupled to said output channel, and means for applying clock signals from said clock circuit to said flip-flop circuit.

23. In a communication system, a receiver for receiving transmitted signals modulated by bits of digital information on a clock cycle of a certain frequency with a plurality of bits of digital information at a certain bit rate in an initial portion of each cycle having a maximum duration equal to one-half of the complete cycle, said receiver comprising: input and output channels, shift register means for receiving digitally modulated signals from said input channel and applying said digitally modulated signals to said output channel, clock means arranged to supply a first clock signal at a rate equal to said certain bit rate and a second clock signal at a rate at least equal to twice said certain bit rate, means for applying said second clock signal to said shift register means during application of said digitally modulated signal from said input channel thereto, and means for applying said first clock signal to said shift register means during transfer of signals therefrom to said output channel.

* * * * *